United States Patent
Wasiuk et al.

(10) Patent No.: US 9,965,460 B1
(45) Date of Patent: May 8, 2018

(54) KEYWORD EXTRACTION FOR RELATIONSHIP MAPS

(71) Applicant: KONICA MINOLTA LABORATORY U.S.A., INC., San Mateo, CA (US)

(72) Inventors: Julie Wasiuk, Sunnyvale, CA (US); Daniel Barber, San Francisco, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days. days.

(21) Appl. No.: 15/394,436

(22) Filed: Dec. 29, 2016

(51) Int. Cl.
*G06F 17/27* (2006.01)
*G06F 17/21* (2006.01)

(52) U.S. Cl.
CPC ............ *G06F 17/278* (2013.01); *G06F 17/21* (2013.01); *G06F 17/274* (2013.01); *G06F 17/2765* (2013.01); *G06F 17/271* (2013.01); *G06F 17/2705* (2013.01)

(58) Field of Classification Search
CPC .... G06F 17/27; G06F 17/271; G06F 17/2765; G06F 17/2705; G06F 17/278
See application file for complete search history.

(56) References Cited

U.S. PATENT DOCUMENTS

| | | | | |
|---|---|---|---|---|
| 6,173,251 B1 * | 1/2001 | Ito | ........................ | G06F 17/3061 704/10 |
| 2009/0006377 A1 * | 1/2009 | Kobayashi | .......... | G06F 17/3071 |
| 2010/0005083 A1 * | 1/2010 | Morgana | ........... | G06F 17/30616 707/E17.008 |
| 2010/0145678 A1 * | 6/2010 | Csomai | ................. | G06F 17/241 704/9 |
| 2011/0060747 A1 * | 3/2011 | Rose | ................. | G06F 17/30616 707/750 |
| 2012/0117092 A1 * | 5/2012 | Stankiewicz | ..... | G06F 17/30654 707/755 |
| 2012/0204104 A1 * | 8/2012 | Walsh | ............... | G06F 17/30705 715/273 |
| 2015/0088491 A1 * | 3/2015 | Fume | .................... | G06F 17/278 704/9 |

OTHER PUBLICATIONS

Bracewell et al.,"Multilingual Single Document Keyword Extraction for Information Retrieval", Natural Language Processing and Knowledge Engineering, 2005. IEEE NLP-KE'05. Proceedings of 2005 IEEE International Conference on. IEEE, 2005.*

(Continued)

*Primary Examiner* — Samuel G Neway
(74) *Attorney, Agent, or Firm* — Chen Yoshimura LLP

(57) ABSTRACT

Disclosed herein is a method of extracting keywords from a document based on certain statistical, positional and natural language data, as well as relationship maps between the keywords. Under this method, document data are processed to obtain an NLP result for each sentence of the document, and based on the NLP result, words in the document are filtered and grouped into terms; a frequency analysis as well as a co-occurrence analysis are performed over the terms to output one or more keywords representing the document.

20 Claims, 8 Drawing Sheets

(56) References Cited

OTHER PUBLICATIONS

Li et al. "Keyword Extraction Based on ft/idf for Chinese News Document", Wuhan University Journal of Natural Sciences 12.5 (2007).*

Liu, Feifan, et al. "Unsupervised approaches for automatic keyword extraction using meeting transcripts." Proceedings of human language technologies: The 2009 annual conference of the North American chapter of the association for computational linguistics. Association for Computational Linguistics, 2009.*

De Marneffe et al., "Stanford typed dependencies manual", Sep. 2008 (revised in Sep. 2016), 28 pages http://nlp.stanford.edu/software/dependencies_manual.pdf, downloaded from the Internet on Jan. 10, 2017.

* cited by examiner

NER

POS and Dependencies

KEYWORD EXTRACTION FOR RELATIONSHIP MAPS

BACKGROUND OF THE INVENTION

Field of the Invention

This invention generally relates to keyword extraction techniques, and more particularly, a method of extracting keywords from a document based on a combination of NLP (Natural Language Processing) information, frequency analysis as well as co-occurrence analysis of the document data.

Description of Related Art

With the advent of the Internet, there is now both a massive amount of information available, as well as a demand to be able to search through all of this information. As a result, keywords have been commonly used for search engines and document databases to locate specific information, or to determine if two pieces of text data are related to each other. Due to the intricate complexities of natural language, however, it can be quite challenging to locate and define a set of words (aka, the keywords) that accurately convey the theme or describe the topics contained in the text. Various keyword extraction techniques have been developed over the years. Despite their differences, most methods attempt to do the same thing: using some heuristic, such as distance between words, frequency of word use or predetermined word relationships, to locate and define keywords in a document or a piece of text data.

In some circumstances, these methods may not be sufficient or efficient, and thus, additional measurements are needed to help extract the keywords. For example, most content processed by printers in an organization comprises corporate documents, such as meeting notes or weekly reports, which contain important information regarding individuals or entities and their relationships within the organization. Such information may not be quickly captured using existing keyword extraction techniques. Therefore, a need exists to improve the performance of keyword extraction by combining various techniques, such as statistical, natural language and positional techniques, as well as additional word measurements, such as relationships between the keywords.

SUMMARY

Accordingly, the present invention is directed to a method that improves the performance of existing keyword extraction techniques and that substantially obviates one or more of the problems due to limitations and disadvantages of the related art.

An object of the present invention is to provide a method of extracting keywords from a document based on certain statistical, positional and natural language data, as well as relationship maps between the keywords.

Another object of the present invention is to provide a method of extracting keywords from a document based on a combination of NLP (Natural Language Processing) information, frequency analysis as well as co-occurrence analysis of the document data.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method of extracting keywords from a document based on certain positional and language data, as well as relationship maps between the keywords. Specifically, the method comprises the following steps: receiving and processing document data to obtain paragraphs and sentences, each sentence comprising one or more words; for each sentence of the document data, obtaining an NLP (Natural Language Processing) result relating to a sentence, wherein the NLP result comprises NER (Named Entity Recognition), POS (Part of Speech) and dependency of each word of the sentence, removing at least one word from the sentence based on the NLP result, grouping the remaining words of the sentence into one or more terms, wherein each term is either a word or a multi-word phrase, and storing the terms on a list; applying a frequency analysis to the terms on the list; for each paragraph of the document data, identifying terms whose occurrences in the paragraph meet a first threshold, forming a cluster for the paragraph based on a co-occurrence analysis of the identified terms, and evaluating a connectivity of the formed cluster; excluding at least one paragraph based on the connectivity of the formed clusters; selecting terms that occur in at least two remaining paragraphs; calculating a score for each of the selected terms; and based on the scores of the selected terms, outputting one or more top terms as keywords representing the document data.

In another aspect, the present invention provides a computer program product comprising a computer usable non-transitory medium (e.g. memory or storage device) having a computer readable program code embedded therein for controlling a data processing system, the data processing system comprising a computer and one or more printers, the computer readable program code configured to cause the computer in the data processing system to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention are directed to a method of extracting keywords from a document based on certain statistical, positional and natural language data, as well as relationship maps between the keywords. Specifically, the method comprises the following steps: receiving and processing document data to obtain paragraphs and sentences, each sentence comprising one or more words; for each sentence of the document data, obtaining an NLP (Natural Language Processing) result relating to a sentence, wherein the NLP result comprises NER (Named Entity Recognition), POS (Part of Speech) and dependency of each word of the sentence, removing at least one word from the sentence based on the NLP result, grouping the remaining words of the sentence into one or more terms, wherein each term is either a word or a multi-word phrase, and storing the terms on a list; applying a frequency analysis to the terms on the list; for each paragraph of the document data, identifying terms whose occurrences in the paragraph meet a first threshold, forming a cluster for the paragraph based on a co-occurrence analysis of the identified terms, and evaluating a connectivity of the formed cluster; excluding at least one paragraph based on the connectivity of the formed clusters; selecting terms that occur in at least two remaining paragraphs; calculating a score for each of the selected terms; and based on the scores of the selected terms, outputting one or more top terms as keywords representing the document data.

Figure 1:
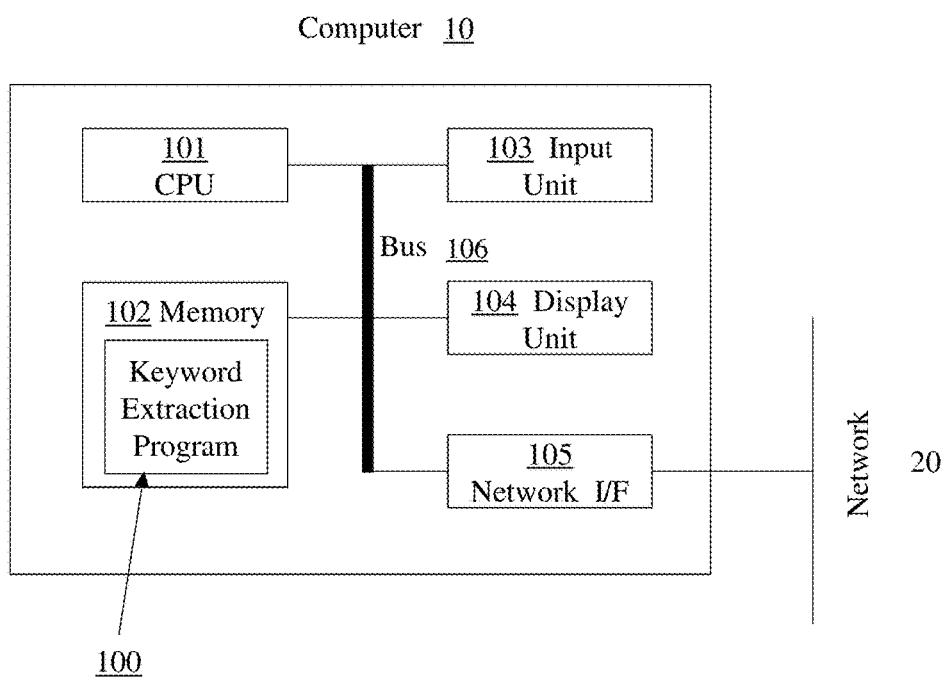
FIG. 1 is a block diagram of a computer in which embodiments of the present invention may be implemented.

Turning to FIG. 1, provided is a block diagram of an exemplary computer in which embodiments of the present invention may be implemented. As shown in FIG. 1, this computer 10 comprises a Central Processing Unit (CPU) 101, a memory 102, an input unit 103 such as a keyboard or a tablet stylus pen, a display unit 104 such as a computer monitor or touchscreen display, and a network interface 105, all these components (including those not shown) communicating with each other internally via a bus 106. Through the network interface 105, the computer 10 is connected to a network 20, such as a LAN or WAN, and communicate with other devices connected to the network.

Usually the memory 102 stores computer-executable instructions or software programs accessible to the CPU 101, which is configured to execute these software programs as needed in operation. Preferably, such software programs are designed to run on Windows OS, Macintosh OS, or Unix X Windows or other popular computer operating systems implementing a GUI (graphic user interface), such as a touchscreen and/or a mouse and a keyboard, coupled with a display monitor. In one embodiment, such software in the memory 102 includes a keyword extraction program 100, which, when executed by the CPU 101, enables the computer 10 to extract keywords from documents received by the computer 10.

In addition to the keyword extraction program 100, the CPU 101 is also configured to execute other types of software (e.g., administrative software), applications (e.g., network communication application), operating systems, etc.

Figure 2:
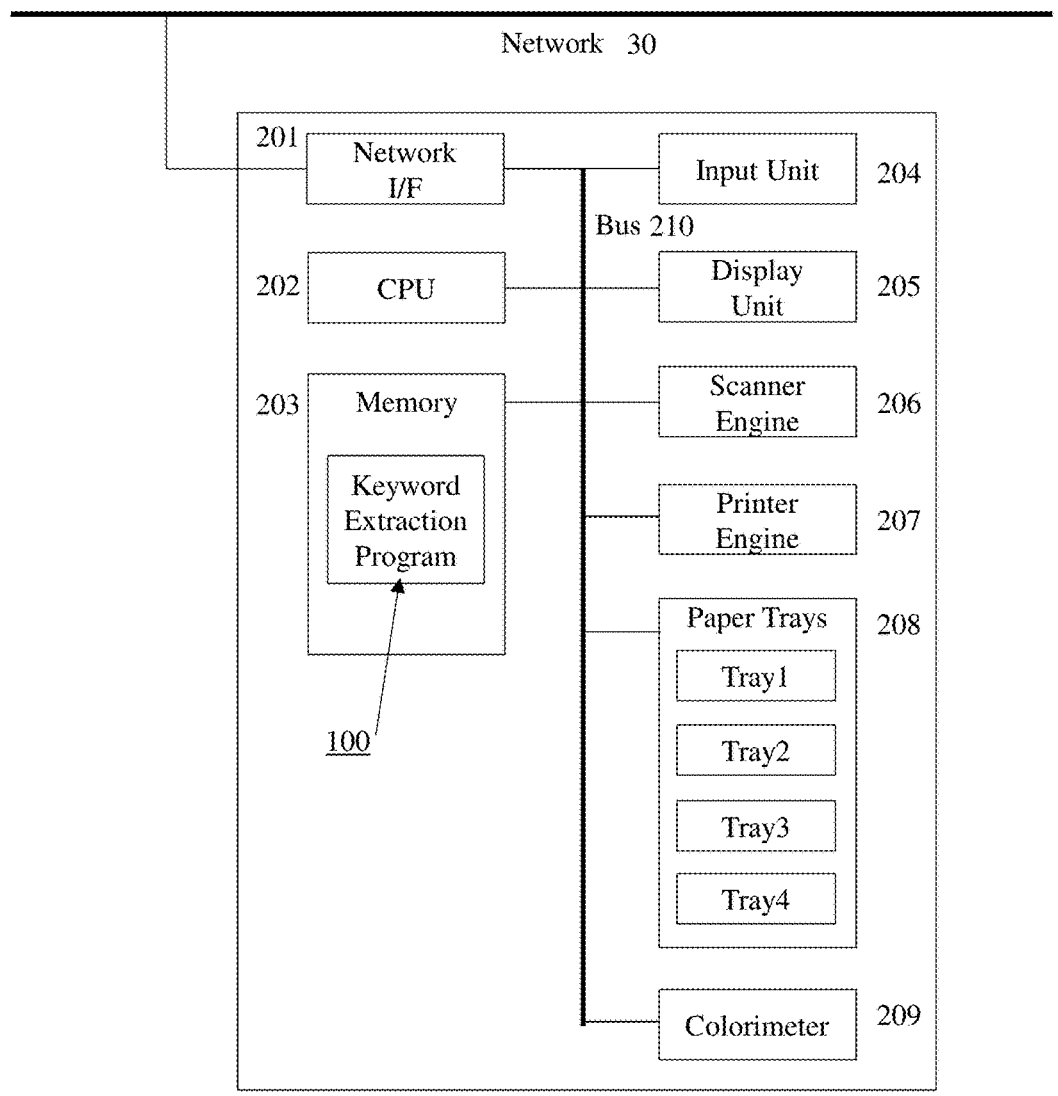
FIG. 2 is a block diagram of a multifunctional printer in which embodiments of the present invention may be implemented.

FIG. 2 presents an exemplary multifunctional printer (MVP) system in which embodiments of the invention may be implemented. As shown in FIG. 2, this MVP 20 comprises a network interface 201, a Central Processing Unit (CPU) 202, a memory 203, an input unit 204 such as a keyboard, touch screen or a tablet stylus pen, a display unit 205 such as a computer monitor or touchscreen display, a scanner engine 206 for creating digital files (e.g., pdf or jpeg files) out of the data input (e.g., a physical document), a printer engine 207 for receiving and processing printing jobs, a number of paper trays 208 for storing printing papers, and a colorimeter 209 for measuring the intensity of colors for printing purposes. All these components (including those not shown) communicate with each other internally via a bus 210.

Through the network interface 201, the MVP 20 is connected to a network 30, such as a LAN or WAN, and communicate with other devices connected to the network, for example, a computer or a mobile device configured to send printing jobs to the MVP 20.

In one embodiment, the memory 203 is configured to store a keyword extraction program 100, which, when executed by the CPU 202, enables the MVP 20 to extract keywords from documents received by the MVP 20.

As will be described in detail below, the keyword extraction program 100 enables the MVP 20 in FIG. 2 or the computer 10 in FIG. 1 to extract keywords from a document by extracting NLP data of the document and performing a frequency analysis as well as a co-occurrence analysis based on the NLP data.

Figure 3A:
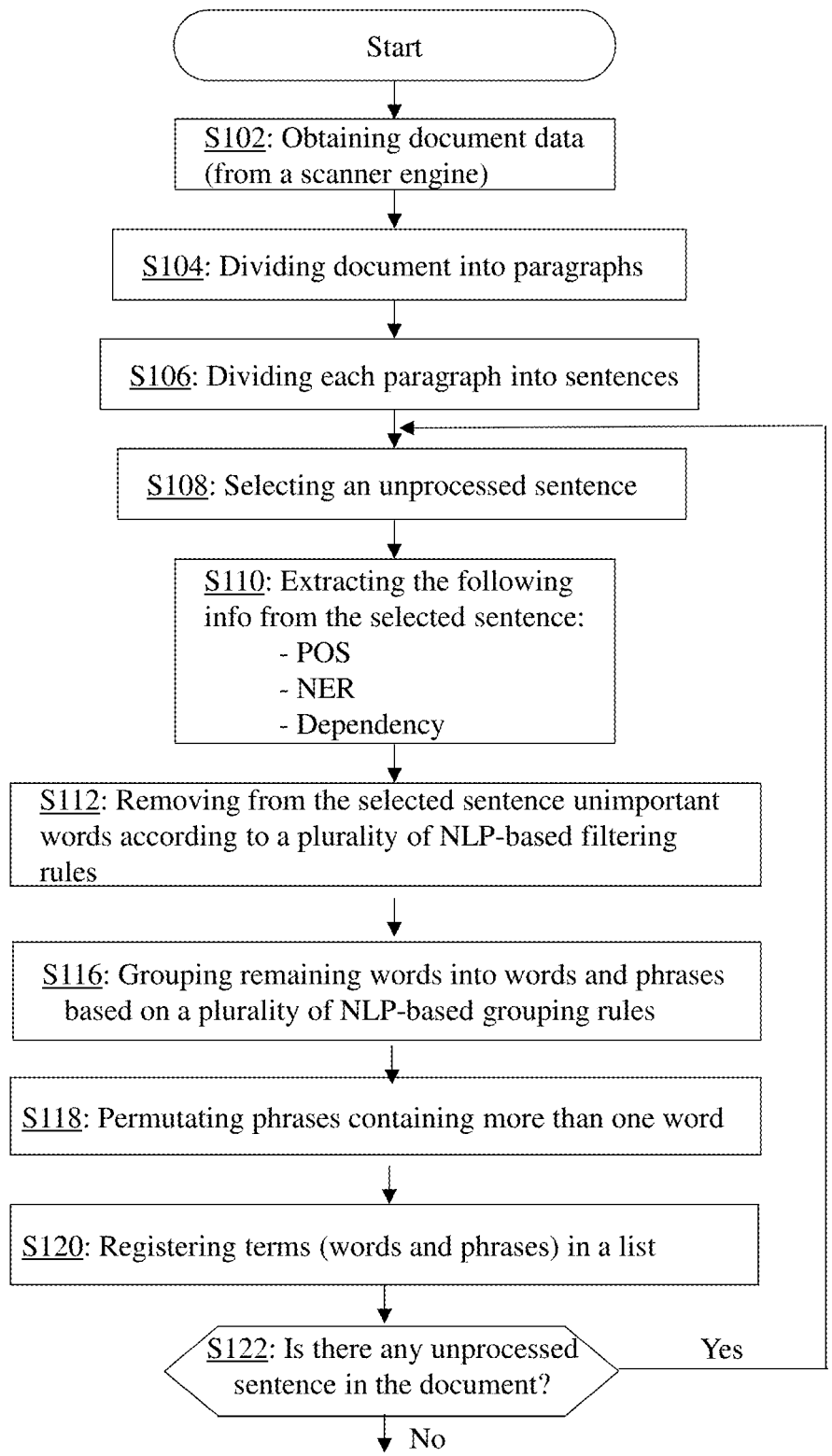
FIGS. 3A-C present a flow chart diagram illustrating an exemplary keyword extraction algorithm according to embodiments of the present invention.
Figure 3B:
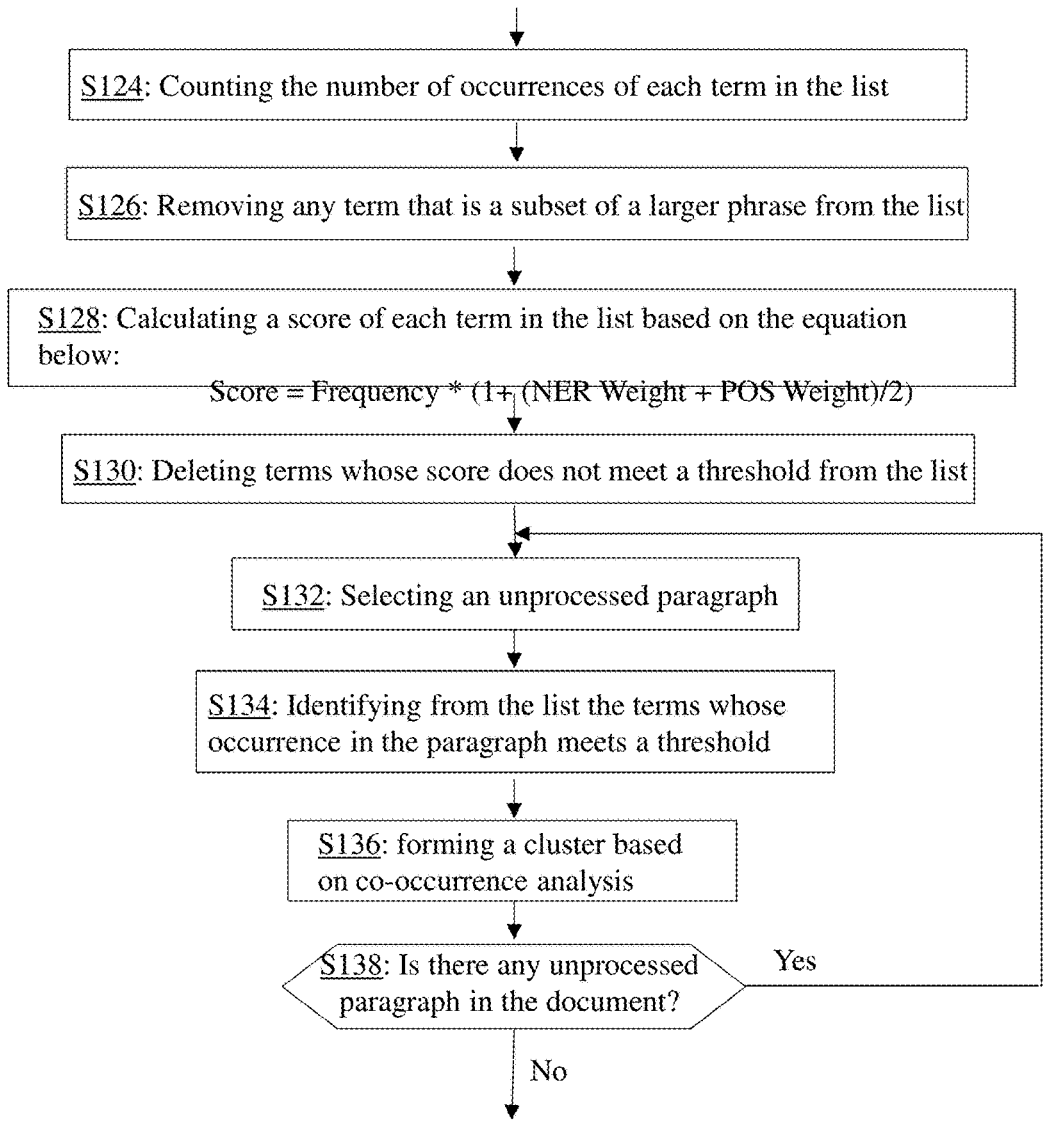
Figure 3C:
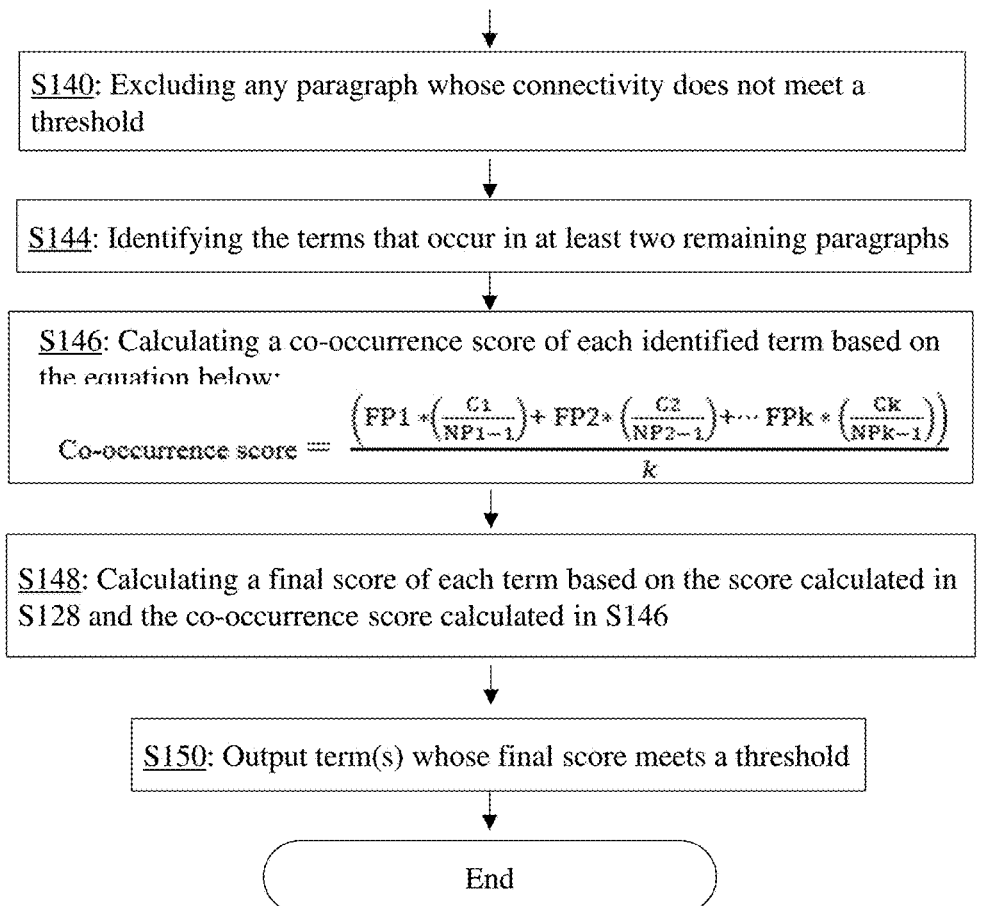

In FIG. 3A-C, a flow chart diagram illustrates an exemplary algorithm underlying the keyword extraction program 100 of FIGS. 1 and 2. Details of each step in this algorithm will be described with reference to the examples depicted in FIGS. 4A-B and 5A-C.

As shown in FIG. 3A, the algorithm starts at step S102 where document data is obtained, for example, from a scanner engine that transforms a data input (e.g., a physical document) into its digital format (e.g., a pdf or jpeg file). The document data can be a text file or an image file or any other file format, as long as it can be segmented. When the document data comprises an image file, the keywords to be extracted can be metadata of the image file. In the case of an email including the image file, the keywords can be the title or subject line of the email. At step S104, the received document is divided into different paragraphs, and each paragraphs is further divided into multiple individual sentences at step S106. This can be easily done using existing document processing methods.

Figure 4A:
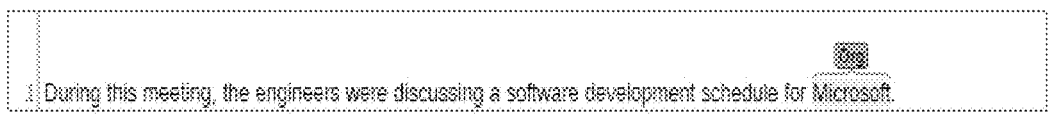
FIGS. 4A-B provide an example that illustrates a process for pre-processing documents and obtaining NLP data in the algorithm of FIGS. 3A-C according to embodiments of the present invention.
Figure 4B:

Proceeding to step S108, the algorithm selects an unprocessed sentence from the multiple sentences as a result of step S106. At step S110, the selected sentence is fed into a Natural Language Processing (NLP) system to extract certain NLP information, including the Named Entity Recognition (NER), Part of Speech (POS) and dependency of each word in the selected sentence. For example, as illustrated in FIGS. 4A-B, the NER information for the word "Microsoft" is an organization, and the POS tag for the word "Microsoft" is NNP (Proper Noun Singular Form). Also, the word "Microsoft" has one dependency with the word "for," tagged as IN (Proposition), and another dependency with the word "schedule," tagged as NN (Common Noun). Such extracted information, also referred as NLP data, can be used to help filter out certain words of the sentence, as will be described in detail below. By using the NLP information rather than a traditional list of "Stop Words" as the filtering basis, the current algorithm can further expand the list of unimportant words for removal, and get to the true subjects or core content of the sentence with increased accuracy.

Specifically, at step S112, unimportant words are removed from the sentence in accordance with certain filtering rules that are pre-defined or created in view of the characteristics or patterns of the NLP data. For example, words marked as IN (Preposition) (e.g., the word "during" in FIGS. 4A-B) and DT (Determiner) (e.g., "this" or "the" or "a" in FIGS. 4A-B) should be removed because these types of words are almost always unimportant. Also, if a word is tagged as VBD (Verb, past tense) and has a sentence dependency as an AUX (Auxiliary), e.g., the word "were" in FIGS. 4A-B, this is a non-primary verb of a clause and should be removed. Below is a list of examples of these NLP-based filtering rules:

AUX (auxiliary), AUXPASS (passive auxiliary) verbs are removed from our list
IN (Preposition) are removed;
DT (Determiner) are removed;
NEG (Negation) are removed;
XCOMP (Open casual compliment) are removed;
ADVMOD (adverbial modifier) are removed.

In the example in FIGS. 4A-B, if the above filtering rules are applied to remove unimportant words from the sentence, the remaining words will be as follows: "meeting engineers discussing software development schedule Microsoft."

Next, the algorithm proceeds to step S116, at which the remaining words are grouped into phrases in accordance with a plurality of NLP-based grouping rules. For example, nouns (NN) that have compound noun modifiers should be grouped with those modifiers. If this rule is applied to the example in FIGS. 4A-B, the result is, these words "software," "development," and "schedule" would be grouped into one phrase of "software development schedule." Below is a list of examples of the NLP-based grouping rules:

NN (Nouns) that have compound noun modifiers will be grouped with those modifiers;
NUMMOD (Numbers) are grouped with nouns where appropriate;
If VBN (Verb, past participle) are used as AMOD (adjectival modifier), they are grouped with their appropriate nouns based on the dependency tree;
If VBN (Verb, past participle) are used as AMOD (adjectival modifier) and RB (Adverb) are used as ADVMOD (adverb modifier), all these words are grouped in order with the appropriate noun based on the dependency tree;
If CD (Numbers) are used in any sequential words, they will be treated as compound numbers and grouped.
POS (Possessive) nouns are grouped using the dependency of "nmod:poss" with the nouns that they modify.

According to these grouping rules, the remaining words after the filtering step as stated above would be grouped as follows: "meeting," "engineers," "discussing," "software development schedule" and "Microsoft."

As a result of the grouping step, there will some phrases that contain more than one word. These multi-word phrases will receive some basic permutations at step S118. As an example, the phrase of "software development schedule" may be permuted to result in the following variations: "software" "software development" "development" "development schedule" and "schedule." The purpose of this permutation step is to take into consideration how human beings typically speak (e.g., saying the same thing in varied ways), thereby making the subsequent word-frequency analysis more accurate and reflective of the human language.

There are certain language rules to be applied in permuting the words within a phrase. For example, phrases that have been positively identified by NER should not be permuted. This means, such phrases as "Stanford University" or "Konica Minolta" would not be permuted to result in the following words: {"Stanford", "University"} or {"Konica", "Minolta"}. Additionally, the original order of words in the phrase should always be preserved when the phrase is permuted. For example, permutation of the phrase "software development schedule" would not yield such variation as "schedule development" because the original word order of having "development" prior to "schedule" should be preserved.

After the filtering, grouping and permuting steps S112, S116 and S118 as stated above, the resulting terms are stored or registered in a list as keyword candidates at step S120. At step S122, the algorithm determines whether any unprocessed sentence remains in the document. If there is any unprocessed sentence, this sentence will be pre-processed following the steps S108 to S118. This part of the algorithm repeats until every sentence in the document is processed, at which point, the algorithm continues to the next phase of frequency analysis over the stored terms starting at step S124 in FIG. 3B.

At step S124, for every term registered in the list of keyword candidates, its occurrences or frequencies in the document will be counted and ranked in a list as follows:

TABLE 1

| Term | Frequency |
| --- | --- |
| Software | 15 |
| Development | 13 |
| Schedule | 11 |
| Software Development | 11 |
| Development Schedule | 11 |
| Software Development Schedule | 11 |
| Microsoft | 9 |
| Meeting | 8 |
| Code | 7 |
| Discussing | 7 |
| QA | 5 |
| . . . Many more words and phrases . . . | . . . |

According to the list in Table 1, the term "software" has the highest frequency, having occurred in the document for 15 times. Notably, these terms, including "Schedule," "Software Development," "Development Schedule" and "Software Development Schedule," are the result of the previous permutation step, and they all have the same frequency of 11 times. This indicates that these terms do not exist independently and only occur as a subset of their larger phrase of "Software Development Schedule." Thus, the smaller terms will be removed at step S126, which results in a modified list as follows:

TABLE 2

| Term | Frequency |
| --- | --- |
| Software | 15 |
| Development | 13 |
| Software Development Schedule | 11 |
| Microsoft | 9 |
| Meeting | 8 |
| Code | 7 |
| Discussing | 7 |
| QA | 5 |
| . . . Many more words and phrases . . . | . . . |

In the list of Table 2, the terms are ranked according to their generic frequency, i.e., the number of their occurrences in the document. However, such ranking may not reflect the actual relevance or importance of these terms because, in practice, some terms that occur less frequently may be more important or significant in conveying the theme of the document. In that case, other information regarding these terms, such as the extracted NLP data of these terms, needs to be considered in addition to their generic frequencies. In one embodiment, as shown at step 128, a score is calculated for each term on the above list using the following equation:

$$Score = Frequency \times [1+(NER\ Weight + POS\ Weight)/2]$$

where different weights are given to the NER and POS properties of a term, and such weights are averaged and multiplied by the frequency in order to determine the actual relevance of the term. For example, if the NER property of a term is "Organization," the term may be given an NER weight of "1," and if the NER property is "Person," the term may be given an NER weight of "0.75." The chart below shows a few exemplary weights for different NER properties.

TABLE 3

| Named Entity Recognition (NER) | Weight |
|---|---|
| Organization | 1 |
| Person | .75 |
| Location | .5 |

Using the term "software" in the above Tables 1-2 as an example, if its NER weight is "0" and POS weight is "0.25," then its frequency score will be 16.875=15×[1+(0+0.25)/2]. As shown in the chart below, each term is given an NER weight and a POS weight, and a corresponding score is calculated for the term

TABLE 4

| Term | Frequency | NER Weight | POS weight | Score |
|---|---|---|---|---|
| Software | 15 | 0 | .25 | 15 * 1.125 = 16.875 |
| Development | 13 | 0 | .25 | 13 * 1.125 = 16.25 |
| Software Development Schedule | 11 | 0 | .25 | 11 * 1.125 = 13.75 |
| Microsoft | 9 | 1 | .25 | 9 * 1.416 = 14.625 |
| Meeting | 8 | 0 | .25 | 8 * 1.125 = 9 |
| Code | 7 | 0 | .25 | 7 * 1.125 = 7.875 |
| Discussing | 7 | 0 | .10 | 7 * 1.05 = 7.35 |
| QA | 5 | 0 | .25 | 5 * 1.125 = 5.625 |
| ... Many more words and phrases ... | ... | ... | ... | ... |

As seen in the above Table 4, the term "Microsoft" appears 9 times in the document, less than the phrase "Software Development Schedule" that occurs 11 times. But because the term "Microsoft" has a much higher NER weight than "Software Development Schedule," its score (14.625) is higher. As such, "Microsoft" would rank higher than the term of "Software Development Schedule."

Based on the final scores in Table 4 above, those terms whose scores do not meet a threshold will be deleted from the list at step S130. In other words, a user can choose a threshold and only the top x terms above the threshold will remain on the list. For example, if the user-decided threshold is 7, then only terms whose scores are above 7 will remain on the list. This means, in the example of Table 4, only those terms ranked above "QA" will remain on the list. The remaining terms will be used as nodes for the next phrase of co-occurrence analysis starting at step S132 in order to finally identify the keywords.

Figure 5A:
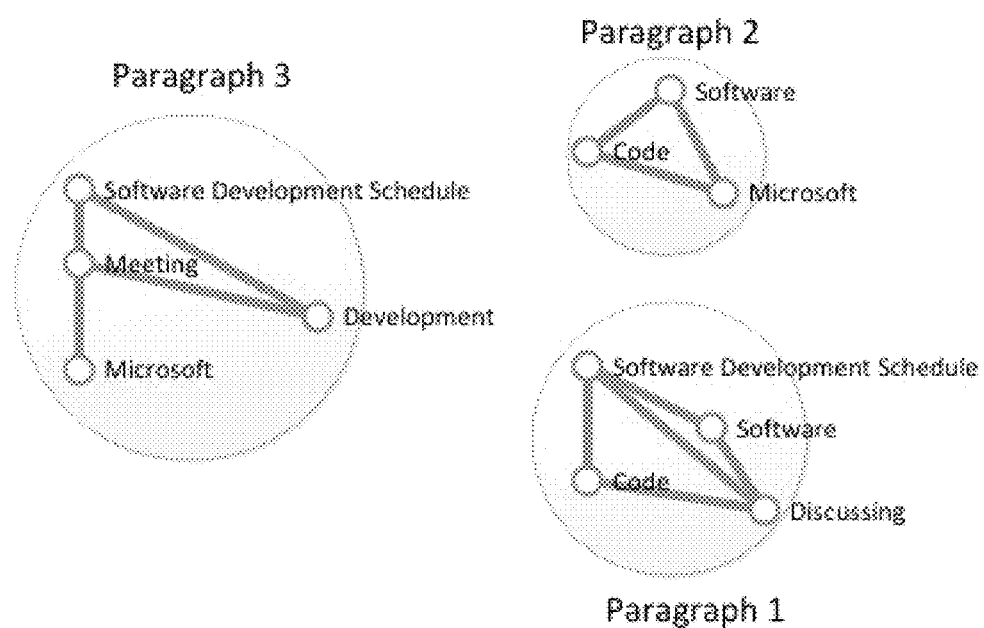
FIGS. 5A-C provide an example that illustrates a cluster-forming process and co-occurrence analysis in the algorithm of FIGS. 3A-C according to embodiments of the present invention.

The co-occurrence analysis is conducted on a paragraph level. In other words, every paragraph of the document will be processed for the purpose of co-occurrence analysis of the terms. At step S132, the algorithm first selects an unprocessed paragraph or chunk of text. Proceeding to step S134, the algorithm measures how frequently each of the remaining terms on the list occurs in the given paragraph, and if the occurrence meets a threshold, then the term will be considered as a node of a graph to be created for the paragraph. As a result, for the selected paragraph, a few terms whose occurrences meet the threshold will be identified and used as nodes for further analysis. For example, as shown in FIG. 5A, for Paragraph 1, four terms "Software Development Schedule," "Software," "Code," "Discussing" are identified and used as nodes; for Paragraph 2, three terms "Software," "Code," "Microsoft" are used as nodes; for Paragraph 3, four terms "Software Development Schedule," "Meeting," "Microsoft," "Development" are used as nodes.

Back to FIG. 3B, at step S140, these identified terms or nodes are used to form a cluster-based co-occurrence analysis. Specifically, for each identified term or node, the algorithm determines whether this term co-occurs with another term in at least one single sentence of the selected paragraph, and if so, an edge or connection is established between the two nodes. For example, in Paragraph 1 of FIG. 5A, because the term of "Software Development Schedule" co-occurs with the term "code" in the same sentence of Paragraph 1, these two terms are connected via an edge. On the other hand, the term "code" and the term "software" do not occur in the same sentence of Paragraph 1, and thus there is no edge or connection between these two terms.

As aforementioned, each paragraph or chunk of text of the document will be processed for the purpose of co-occurrence analysis. Thus, at step S138, the algorithm determines whether there is any unprocessed paragraph, and if yes, repeats the steps of S132, S134 and S136 for the unprocessed paragraph. Otherwise the algorithm continues to step S140, where any paragraph whose connectivity does not meet a threshold will be eliminated.

Figure 5B:
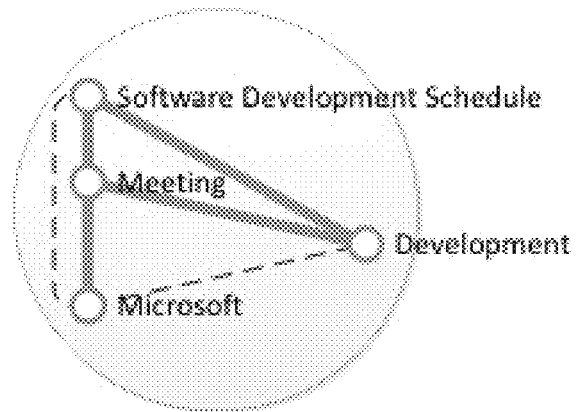

This elimination step is done through the following process: first, as a result of the previous co-occurrence analysis, a cluster-based graph is generated for each paragraph. As shown in FIG. 5A, such a cluster or cluster-based graph comprises a few nodes and connections between the nodes. Then, the intersections or connections in each graph will be evaluated to determine the connectivity of the corresponding paragraph. In a perfect graph, all nodes are connected to all other nodes, in which case the connectivity between the terms of a paragraph is the highest, namely, 100%. For a graph to be considered perfect, for n nodes, each node should have n-1 connections or edges, and the graph should have a total of n*(n−1)/2 edges. For example, both Paragraph 1 and Paragraph 3 in FIG. 3A have four (4) nodes. For a graph with 4 nodes, there should be a total of 6=4*(4−1)/2 edges. As shown in FIG. 5B, if the dotted lines actually existed in Paragraph 3, then this graph would have been perfect with the highest connectivity of 100%. Because Paragraph 3 has only 4 out of 6 connections, its connectivity is down to about 66.7%=4/6. Paragraph 1 has 5 out of 6 connections, and thus its connectivity is about 83.3%=5/6. Paragraph 2 has 3 out of 3 connections, thus it has the highest interconnectivity of 100%. If the user-decided threshold is 70%, then Paragraph 3 whose connectivity is below 70% will be eliminated from further consideration. The remaining Paragraph 1 and Paragraph 2, particularly those terms occurring in both paragraphs, will be further analyzed in the following steps.

Figure 5C:
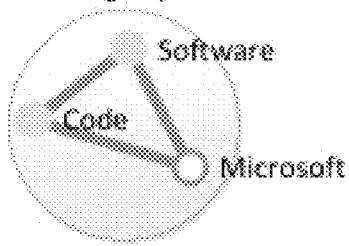
Figure 5C:
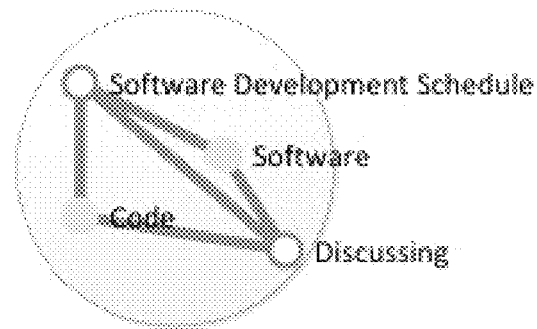

At step S144, terms that occur in at least two remaining paragraphs will be selected for further analysis. In the case of Paragraph 1 and Paragraph 2, as shown in FIG. 5C, their overlapped terms are "Software" and "Code." Thus, these two terms will be selected at step S144. Then, at step S146, a co-occurrence score is calculated for each of the overlapped terms using the equation below:

$$\text{Co-occurrence score} = \frac{\left(FP1*\left(\frac{C1}{NP1-1}\right)+FP2*\left(\frac{C2}{NP2-1}\right)+\ldots FPk*\left(\frac{Ck}{NPk-1}\right)\right)}{k}$$

where FPk is the frequency of term x in paragraph k, Ck is the number of edges connected to the node for term x in graph k, and NPk is the number of nodes in the graph for paragraph k. For example, assuming the term "Code" occurred three (3) times in Paragraph 1 and four (4) times in Paragraph 2, the co-occurrence score for this term according to the above equation is as follows:

$$= \frac{\left(3*\frac{2}{3}+4*\frac{2}{2}\right)}{2}$$
$$= \frac{2+4}{2}$$
$$= 3$$

Also, assuming the term "Software" occurred six (6) times in Paragraph 1 and five (5) times in Paragraph 2, the co-occurrence score for this term according to the above equation is as follows:

$$= \frac{6*\frac{2}{3}+5*\frac{2}{2}}{2}$$
$$= \frac{4+5}{2}$$
$$= 4.5$$

With this co-occurrence score and the previous frequency score at step S128, at step S146, a final score is calculated for each overlapped term. In one embodiment, the final score is a result of multiplying the frequency score with the co-occurrence score. Following this calculation, the final scores for the terms "Software" and "Code" are as follows:

TABLE 5

| Term | Frequency Score | Co-occurrence Score | Final Score |
| --- | --- | --- | --- |
| Software | 16.875 | 4.5 | 16.875 * 4.5 = 75.938 |
| Code | 7.875 | 3 | 7.875 * 3 = 23.625 |

Finally, at step 150, terms whose final scores meet a certain threshold will be provided as the keywords for the document. In the above example, the terms "Software" and "Code" will be provided as keywords for the processed document. In case a user requests more than two keywords be returned for the processed document, the algorithm may return these two terms "Software" and "Code," followed by the remaining terms in the list according to their ranking orders, as shown in Table 4. It should be noted that by calculating the final score based on both the frequency and co-occurrence of the terms, the algorithm gives more importance to those terms that occur frequently throughout a document as opposed to the terms that only occur frequently in one section or one paragraph. In the current example, the final key words are these two terms "Software" and "Code" in that not only they both occur frequently throughout the document, but also they both occur in multiple paragraphs with high connectivity.

It should be understood by those skilled in the art that although the algorithm is described with reference to the flow chart diagram in FIGS. 3A-C, it is not so limited. Instead, many variations and modifications of these steps, including the not-shown steps, can be incorporated in the actual implementation of the algorithm.

While various embodiments of the invention have been described above, it should be understood that they have been presented by way of example only, and not by way of limitation. Likewise, the various diagrams may depict an exemplary configuration for the disclosure, which is done to aid in understanding the features and functionality that can be included in the disclosure. For example, the examples in FIGS. 4A-B and 5A-C present a text file as the processed document, for which the keywords are words and phrases, but in practice, the actual documents can be in various formats, including, without limitation, a scanned image file, in which case the terms or keywords can be metadata or title of an email including the image file. Thus, the disclosure is not restricted to the illustrated exemplary configurations, but can be implemented using a variety of alternative configurations.

It will be apparent to those skilled in the art that various modification and variations can be made in the above-described method and system of the present invention without departing from the spirit or scope of the invention. Thus, it is intended that the present invention cover modifications and variations that come within the scope of the appended claims and their equivalents.

What is claimed is:

1. A method for keyword extraction, comprising:
receiving and processing document data to obtain paragraphs and sentences, each sentence comprising one or more words;
for each sentence of the document data, obtaining an NLP (Natural Language Processing) result relating to a sentence, wherein the NLP result comprises NER (Named Entity Recognition), POS (Part of Speech) and dependency of each word of the sentence, removing at least one word from the sentence based on the NLP result, grouping the remaining words of the sentence into one or more terms, wherein each term is either a word or a multi-word phrase, and storing the terms on a list;
applying a frequency analysis to the terms on the list;
for each paragraph of the document data, identifying terms whose occurrences in the paragraph meet a first threshold, forming a cluster for the paragraph based on a co-occurrence analysis of the identified terms, and evaluating a connectivity of the formed cluster;
excluding at least one paragraph based on the connectivity of the formed clusters;
selecting terms that occur in at least two remaining paragraphs;
calculating a score for each of the selected terms; and
based on the scores of the selected terms, outputting one or more top terms as keywords representing the document data.

2. The method of claim 1, further comprising permuting the multi-word phrases before storing the terms on the list.

3. The method of claim 1, wherein the frequency analysis comprises:

for each term on the list, counting its occurrences in the document data to obtain a frequency of the term, and calculating a frequency score for the term based on its frequency.

4. The method of claim 3, wherein the frequency score is calculated according to the following equation: Score=Frequency×[1+(NER Weight+POS Weight)/2].

5. The method of claim 3, wherein the frequency analysis further comprises:
if two or more terms have the same frequency and at least one term is a subset of another term, removing the at least one term that is a subset of another term.

6. The method of claim 3, wherein the frequency analysis further comprises:
deleting at least one term whose frequency score does not meet a second threshold.

7. The method of claim 1, wherein the co-occurrence analysis comprises:
using the identified terms as nodes of a graph; and
forming a connection between any two nodes if their corresponding terms co-occur in a sentence of the paragraph,
where the cluster is formed to comprise the nodes and connections between the nodes.

8. The method of claim 7, wherein the connectivity of the formed cluster is a result of dividing the actual connections in the formed cluster against a maximum of connections for the nodes in the formed cluster.

9. The method of claim 1, wherein the at least one paragraph is excluded if the connectivity of its corresponding cluster is below a third threshold.

10. The method of claim 3, further comprising:
calculating a co-occurrence score for each selected term; and
multiplying the frequency score and the co-occurrence score of the selected term to obtain the score of the selected term.

11. A computer program product comprising a computer usable non-transitory medium having a computer readable program code embedded therein for controlling a data processing apparatus, the computer readable program code configured to cause the data processing apparatus to execute a process for handwriting recognition, the process comprising:
receiving and processing document data to obtain paragraphs and sentences, each sentence comprising one or more words;
for each sentence of the document data, obtaining an NLP (Natural Language Processing) result relating to a sentence, wherein the NLP result comprises NER (Named Entity Recognition), POS (Part of Speech) and dependency of each word of the sentence, removing at least one word from the sentence based on the NLP result, grouping the remaining words of the sentence into one or more terms, wherein each term is either a word or a multi-word phrase, and storing the terms on a list;
applying a frequency analysis to the terms on the list;
for each paragraph of the document data, identifying terms whose occurrences in the paragraph meet a first threshold, forming a cluster for the paragraph based on a co-occurrence analysis of the identified terms, and evaluating a connectivity of the formed cluster;
excluding at least one paragraph based on the connectivity of the formed clusters;
selecting terms that occur in at least two remaining paragraphs;
calculating a score for each of the selected terms; and
based on the scores of the selected terms, outputting one or more top terms as keywords representing the document data.

12. The computer program product of claim 11, where the process further comprises permuting the multi-word phrases before storing the terms on the list.

13. The computer program product of claim 11, wherein the frequency analysis comprises:
for each term on the list, counting its occurrences in the document data to obtain a frequency of the term, and calculating a frequency score for the term based on its frequency.

14. The computer program product of claim 13, wherein the frequency score is calculated according to the following equation: Score=Frequency×[1+(NER Weight+POS Weight)/2].

15. The computer program product of claim 13, wherein the frequency analysis further comprises:
if two or more terms have the same frequency and at least one term is a subset of another term, removing the at least one term that is a subset of another term.

16. The computer program product of claim 13, wherein the frequency analysis further comprises:
deleting at least one term whose frequency score does not meet a second threshold.

17. The computer program product of claim 11, wherein the co-occurrence analysis comprises:
using the identified terms as nodes of a graph; and
forming a connection between any two nodes if their corresponding terms co-occur in a sentence of the paragraph,
where the cluster is formed to comprise the nodes and connections between the nodes.

18. The computer program product of claim 17, wherein the connectivity of the formed cluster is a result of dividing the actual connections in the formed cluster against a maximum of connections for the nodes in the formed cluster.

19. The computer program product of claim 11, wherein the at least one paragraph is excluded if the connectivity of its corresponding cluster is below a third threshold.

20. The computer program product of claim 13, wherein the process further comprises:
calculating a co-occurrence score for each selected term; and
multiplying the frequency score and the co-occurrence score of the selected term to obtain the score of the selected term.

* * * * *